April 10, 1945.  R. T. CORNELIUS  2,373,294
BEER DISPENSING DEVICE
Filed Aug. 4, 1941
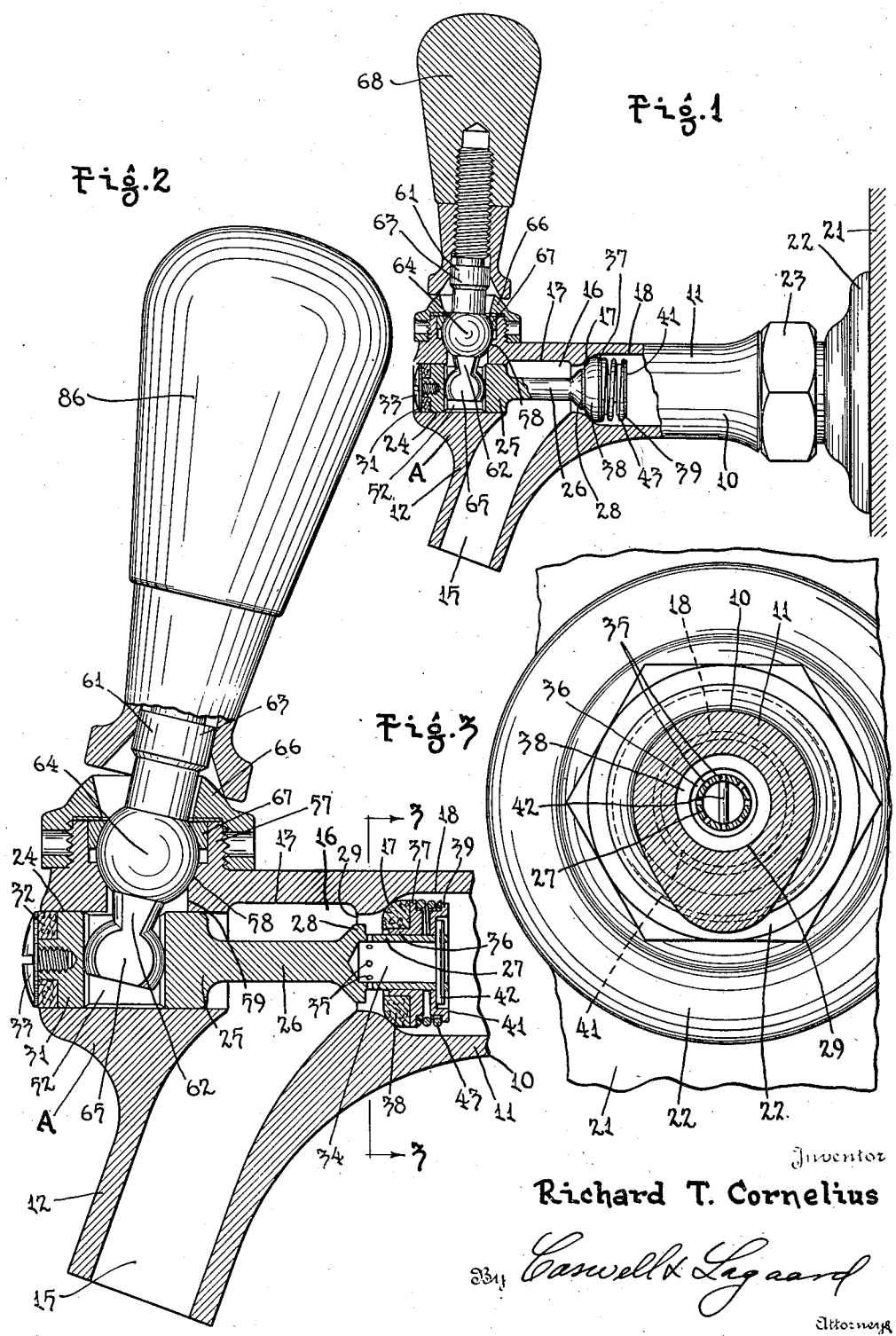
Inventor
Richard T. Cornelius Patented Apr. 10, 1945

2,373,294

UNITED STATES PATENT OFFICE 2,373,294

BEER DISPENSING DEVICE

Richard T. Cornelius, Minneapolis, Minn., assignor to The Cornelius Company, Minneapolis, Minn., a corporation of Minnesota Application August 4, 1941, Serial No. 405,369

7 Claims. (Cl. 225—5)

My invention relates to beer dispensing devices and has for an object to provide a beer dispensing device having means by which clear beer or foamy beer may be drawn at will.

Another object of the invention resides in providing a beer dispensing device in which any height of collar may be formed on the beer drawn.

Another object of the invention resides in providing a beer dispensing device having an operating handle adapted in one position to draw clear beer and in another position to draw foamy beer and in an intermediate position to render the beer dispensing device inoperative.

A feature of the invention resides in providing the dispensing device with two passageways, one through which clear beer passes and the other through which foamy beer passes and in providing valve means for controlling the flow through said passageways, together with a single operating member for operating the valve means.

Another object of the invention resides in providing the valve means with separate valve seats and in providing a single valve head for engaging both of the valve seats.

Other objects of the invention reside in the novel combination and arrangement of parts and in the details of construction hereinafter illustrated and/or described.

In the drawing:

Fig. 1 is an elevational, longitudinal, sectional view of a beer dispensing device illustrating an embodiment of my invention.

Fig. 2 is a view similar to Fig. 1 of a portion of the structure disclosed therein, drawn to an enlarged scale and illustrating the parts in altered position.

Fig. 3 is a cross-sectional view taken on line 3—3 of Fig. 2.

For the purpose of illustrating my invention, I have shown in the drawing a beer dispensing faucet A, which comprises a body 10 having a horizontal portion 11 and an inclined portion 12 connected therewith and extending downwardly therefrom. The portion 11 is constructed with a bore 13 which extends throughout the length of the same and completely through the body at the ends of the portion 11 thereof. The portion 12 constitutes a spout which is provided with a discharge passageway 15 communicating with an enlarged portion 16 of the bore 13 intermediate the ends thereof. In the bore 13 of body 10 is formed a valve seat 17, the bore 13 being enlarged at 18 to form the said valve seat, this portion of the bore forms an inlet passageway, while the portion 16 and the passageway 15 form an outlet passageway for the device.

The faucet is preferably attached to a wall or some similar structure, such as indicated at 21, by means of a flanged fitting 22. The body 10 has a connection 23 thereon whereby the same may be secured to the fitting 22. In the body 10 or within the fitting 22 or in any locality ahead of the valve seat 17 is provided a flow restricting device, such as is now well known in the art, whereby the pressure of the beer is gradually reduced, so that the beer flowing along the inlet passageway 18 and past the valve seat 17 and out of the outlet passageway 15 is relatively clear and free from foam or bubbles. The outer end of the bore 13 is reduced in diameter, as indicated at 24. Slidably mounted within the bore 13 is a plunger 25 which is constructed with a reduced shank 26 intermediate the ends thereof and a stem 27 at its inner end. The said plunger adjacent the stem 27 is formed with a flange 28 of a diameter less than the diameter of the bore 13 at the valve seat 17 to form a passageway 29 thereby, through which the beer may flow. The plunger 25 has a cylindrical head 31 formed on the outer end thereof which snugly fits within the outer portion of bore 13 which is indicated at 24 and serves to guide the plunger for longitudinal movement within said bore. A friction washer 32 mounted on the end of the cylinder head 31 is urged into engagement with the portion 24 of the bore 23 through a screw 33 secured into the end of the said plunger. By means of this construction, sufficient friction is afforded to hold the plunger in any position within the bore 13.

The stem 27 has a bore 34 therein which opens rearwardly through the free end of the said stem and communicates with the passageway 18. This bore terminates in proximity to the flange 28. Extending radially through the stem 27 are a number of small holes 35 which communicate with the bore 34. These holes are located in close proximity to the said flange 28 and form in conjunction with the bore 34 a restricted passageway communicating at all times with the inlet passageway 18 and with the outlet passageway through the passageway 29, when the parts are disposed as shown in Fig. 2. Slidably mounted on the stem 27 is a sleeve 36 which has a flange 37 projecting outwardly therefrom. On this sleeve is mounted a head 38 in the form of a washer constructed of resilient material such as rubber or the like and which is adapted to engage the valve seat 17 to close communication between the inlet passageway 18 and the outlet passageway of the device. This valve head is also adapted to engage the flange 28 which forms another valve seat and when so engaged, closes the restricted passageway comprising the bore 34 and the openings 35 in stem 27. Encircling the outer end of the stem 27 is a cup-shaped washer 39 having a cavity 41 in the end of the same. A pin 42 extends through the stem 27 and is received within the cavity 41. This pin prevents outward longitudinal movement of the washer 39 and is itself held in place in the cavity 41. Between the said washer and the flange 37 of sleeve 36 is a compression coil spring 43, which urges the valve head 38 into engagement with the flange 28 of plunger 25 and maintains pin 42 in cavity 41.

The plunger 25 is reciprocated by means of the following construction: In said plunger is formed an opening 52 which extends vertically through the same. Issuing upwardly from the horizontal portion 11 of the body 10 is a threaded neck 57. At the lowermost portion of this neck is formed a spherical socket 58. This neck has an opening 59 therein, which communicates with the portion 24 of bore 13. The plunger 43 is operated by means of a lever 61 which is constructed with an arm 62 extending through the opening 59 and into the opening 52 and with another arm 63 projecting outwardly from the body 10. This lever is provided with a ball 64 intermediate the end thereof, which is disposed between the two arms 62 and 63 and which is seated in the socket 58. The ball 64 serves as a fulcrum for the lever 61 and permits of the moving of the said lever in a forward and rearward direction. The arm 62 of lever 61 has formed on the end of it a head 65 which fits between the walls of the opening 52 and prevents rotation of the lever 61. Screwed on the threaded neck 57 is a clamp nut 66 which forces a clamp ring 67 down upon the ball 64. This construction holds the ball in proper position so that the lever 61 may be moved to and fro. A handle or knob 68 secured to the end of the arm 63 of lever 61 permits of operation of said lever.

The method of using the device is as follows: When the parts are arranged as shown in Fig. 1, the handle 68 extends directly upwardly and the valve head 38 is seated against both the seat 17 and the flange 28, so that no beer flows through the outlet passageway. The pressure of beer within the passageway 18 holds the head 38 against the seat 17 while the spring 43 holds the said head against the flange 28. When clear beer is to be drawn, the handle 68 is moved forwardly. This reciprocates the plunger 25 longitudinally within the bore 13 and disengages the head 38 from the seat 17. The beer may then flow from the inlet passageway to the outlet passageway and clear beer is discharged from the nozzle 12. After the proper amount of clear beer has been filled in the glass, the handle 68 is moved rearwardly, to the position shown in Fig. 3. This forces the valve head 38 into engagement with seat 17 and prevents the flow of clear beer. At the same time, the plunger 25 is moved forwardly sufficiently to disengage the flange 28 from the head 38. This permits beer to flow through the bore 34 and the openings 35 and through the passageway 29 into the discharge passageway 16. The openings 35 are constructed small enough so that the same agitate the beer and produce foaming. During passage of the beer through these openings, foamy beer is discharged from the nozzle 12. When the handle 68 is released, spring 43 moves the plunger 25 inwardly and brings the flange 28 into engagement with the head 38. This closes the openings 35 and terminates the flow of foamy beer. At the same time, handle 68 is moved to its normal position, as shown in Fig. 1.

The advantages of the invention are manifest. By means of my improved beer dispensing device, either clear beer or foamy beer can be drawn at will by manipulation of the same handle. The auxiliary valve for controlling the foamy beer is formed on the plunger operating the main valve, so that the additional parts required are a minimum. With my invention, a single valve head functions in connection with both valves. My improved beer dispensing device may be constructed at a nominal expense. The device is positive and will not readily get out of order. By removal of the operating lever, the entire plunger and the mechanism connected therewith may be withdrawn from the body, for the purpose of cleaning and examination.

Changes in the specific form of my invention, as herein disclosed, may be made within the scope of what is claimed without departing from the spirit of my invention.

Having described my invention, what I claim as new and desire to protect by Letters Patent is:

1. In a beer dispensing device, a body having an inlet passageway and an outlet passageway, a valve seat between said passageways, a valve member guided for movement toward and from said valve seat, said valve member having a stem and a flange issuing outwardly therefrom, said stem having a passageway therein extending longitudinally thereof and transverse openings at the locality of said flange forming a constricted passageway adapted to communicate with both said inlet and outlet passageways, a valve head slidably mounted on said stem, resilient means for urging said valve head into engagement with said flange to close the passageway in said stem, means for moving said valve member and valve seat away from the seat in said body to open said passageways in the body and for moving said member away from said valve head, while said valve head is seated against said first named seat and in opposition to said resilient means for opening the passageway in said stem.

2. In a beer dispensing device, a body having an inlet passageway and an outlet passageway, a valve seat between said passageways, a plunger guided for longitudinal movement along said passageways, said plunger having a stem and a flange extending outwardly therefrom and of lesser diameter than the bore of said passageway at the seat to permit of flow therebetween, said stem having a passageway therein and an opening therein at the locality of said flange forming a restricted passageway adapted to communicate with both said inlet and outlet passageways, a valve head slidably mounted on said stem and adapted to engage said first-named seat to close said first-named passageways, resilient means for urging said head against said flange to close the passageway in said stem and means for moving said plunger in opposite directions to alternately open said passageways.

3. In a beer dispensing device, a body having an inlet passageway and an outlet passageway, a valve seat between said passageways, a plunger guided for longitudinal movement along said passageways, said plunger having a stem and a flange extending outwardly therefrom and of lesser diameter than the bore of said passageway at the seat to permit of flow therebetween, said stem having a bore open at one end and terminating at said flange, and communicating with said inlet passageway at its open end, said stem having lateral openings extending radially therethrough and communicating with said bore, and adapted to communicate with said outlet passageway, said openings being disposed in close proximity to said flange and forming a constricted passageway in said plunger, a valve head slidably mounted on said plunger, resilient means acting between said valve head and stem for urging said valve head into engagement with said flange to close the passageway in said plunger, said valve head being adapted to engage the seat in said body and means for moving said valve head out of engagement with either said seat or said flange to procure selective flow through the respective passageways controlled thereby.

4. In a beer dispensing device, a body having an inlet passageway and an outlet passageway, a valve seat between said passageways, a plunger guided for longitudinal movement along said passageway, said plunger having a stem and a flange extending outwardly therefrom and of lesser diameter than the bore of said passageway at the seat to permit of flow therebetween, said stem having a constricted passageway therein communicating at one end with said inlet passageway and adapted to communicate at its other end with the outlet passageway at the locality of said flange, a sleeve slidably mounted on said stem, a valve head carried by said sleeve and adapted to engage said valve seat and said flange, a washer supported at the end of said stem and a compression coil spring acting between said washer and sleeve for urging said valve head into engagement with said flange to close said constricted passageway and means for moving said plunger in opposite directions.

5. In a beer dispensing device, a body having an inlet passageway and an outlet passageway, a valve seat between said passageways, a valve member guided for movement toward and from said valve seat, said valve member having a restricted passageway therein adapted to communicate with both said inlet and outlet passageways, a seat formed on said member and disposed in close proximity to said first named seat, a single valve head adapted to engage both the seat in said body and to engage the seat on said valve member, resilient means for urging said valve head into engagement with the seat on said valve member and means for moving said valve member and valve head from the seat in the body to open said passageways in the body and for moving said member away from said valve head, while said valve head is seated against said first named seat and in opposition to said resilient means for opening the passageway in said valve member.

6. In a beer dispensing device, a body having an inlet passageway and an outlet passageway, a valve seat between said passageways, a valve member guided for movement toward and from said valve seat, said valve member having a stem and a flange issuing outwardly therefrom and disposed in proximity to said seat, said stem having a passageway therein extending longitudinally thereof and transverse openings at the locality of said flange forming a constricted passageway adapted to communicate with both said inlet and outlet passageways, a valve head slidably mounted on said stem and having an outwardly extending surface adapted to engage both said seat and said flange, resilient means for urging said valve head into engagement with said flange to close the passageway in said stem, means for moving said valve member and valve head away from the seat in said body to open said passageways in the body and for moving said member away from said valve head, while said valve head is seated against said first named seat and in opposition to said resilient means for opening the passageway in said stem.

7. In a beer dispensing device, a body having an inlet passageway and an outlet passageway, a valve seat between said passageways, a valve member guided for movement toward and from said valve seat, said valve member having a stem and a flange issuing outwardly therefrom and disposed in proximity to said seat, said stem having a passageway therein extending longitudinally thereof and transverse openings at the locality of said flange forming a constricted passageway adapted to communicate with both said inlet and outlet passageways, a valve head slidably mounted on said stem and having a substantially planiform radial surface extending substantially at right angles to the axis of the valve stem and parallel to said flange and further having a substantially conical surface extending away from said planiform surface, said radial surface being adapted to fit against said flange and said conical surface being adapted to fit against the valve seat in the body, resilient means for urging said valve head into engagement with said flange to close the passageway in said stem, means for moving said valve member and valve head away from the seat in said body to open said passageways in the body and for moving said flange away from said valve head, while said valve head is seated against said first named seat and in opposition to said resilient means for opening the passageway in said stem.

RICHARD T. CORNELIUS.